Patented Mar. 11, 1947

2,417,115

UNITED STATES PATENT OFFICE 2,417,115

IMMUNIZING OF SEED FROM PEST ATTACK

Owen Bevan Lean, Windsor, and Percy Wragg Brian, Wokingham, England, assignors to Imperial Chemical Industries Limited, a corporation of Great Britain No Drawing. Application March 24, 1941, Serial No. 385,010. In Great Britain April 5, 1940

14 Claims. (Cl. 167—20)

1

This invention relates to the immunizing of seed from attack by seed-borne fungi and soil fungi and to minimising attack of seed by other pests, for example, birds and grain weevil.

Heretofore, in order to protect seed from the attack of soil fungi and to control seed-borne disease, they have been treated with solid or liquid preparations containing mercury or copper, or with solutions containing formaldehyde. The use of preparations containing mercury or copper, or of solutions containing formaldehyde, tends to inhibit the germination of the seed, while preparations containing mercury are disadvantageous due to their high toxicity to man and other higher animals. Furthermore, such treatments give no protection to the seed against attack by birds.

It has been proposed to render seeds unattractive to birds by treating them with crude tar or with carbon blacks such as are used as pigments or compounding ingredients in the rubber industry. The use of crude tar is liable to cause injury to the seed and to delay their germination, and neither treatment gives any protection against attack by soil fungi or control of seed-borne disease.

It has also been proposed firstly to treat the seeds to render them immune from attack by soil fungi and to control seed-borne disease, and to follow this treatment by another to protect the seeds from attack by birds. Such combined treatment, however, is expensive and not entirely satisfactory.

According to the present invention there is provided a simple and effective process for immunizing seed and for minimising the attack of said seed by pests, which comprises treating the said seed with sulphur nitride or mixtures containing the same.

It is preferable to use sulphur nitride in admixture with suitable fillers or diluents, for example anhydrite, chalk, talc and bentonite, as sulphur nitride alone has a tendency to detonate. Other convenient fillers or diluents are sulphur and ammonium chloride, which are co-precipitated with sulphur nitride when the latter is prepared by passing gaseous ammonia into a solution of a chloride of sulphur in an organic solvent. The mixtures containing sulphur nitride and imino sulphur ($S_7NH$), the preparation of which is described in our co-pending application No. 4693/40, filed March 13, 1940, are also suitable for use according to the present invention.

Seed may be treated according to the present invention by feeding it and a suitable quantity

2 of powdered sulphur nitride or of a powdered mixture containing the same into a rotating drum or tumbler whereby the seeds receive a coating of the powdered material. In general good adherence of the powder to seeds, for example to wheat and oats, can be obtained by this method; but in the case for example of seed having very smooth surfaces, it may be necessary to provide an adhesive in the seed dressing or on the seed in order to obtain a satisfactory coating.

In general, when sown, seeds treated according to the present invention are substantially immune from attack by fungal parasites in the soil, and stronger plants are obtained, while disease on the surfaces of the seed is controlled so that infection of the crop is avoided and increased yields obtained.

While the process of the present invention is applicable to a wide variety of seeds, for example seeds of peas, beans, sugar beet, flax, miscellaneous vegetables, flowers and grasses, it is particularly effective for the treatment of cereal seed which may be infected by such fungal diseases as leaf stripe of oats and barley, bunt of wheat, and smut of oats.

The quantity of sulphur nitride or of mixtures containing the same applied to the seed may vary within fairly wide limits. As an example of a suitable dosage for the treatment of cereals, 2 ounces of a powdered mixture containing 25% sulphur nitride, 14% sulphur, 2% imino sulphur and 59% of ground anhydrite, may be applied to each bushel of seed treated.

We claim:

1. A bird repellent comprising finely divided sulfur nitride and finely divided imino sulfur in admixture with an inert powder.

2. A bird repellent comprising sulfur nitride, imino sulfur, and at least one mineral filler, all in a finely divided solid state, in admixture with a finely divided inert powder.

3. In a method of repelling birds the step of treating material attractive to the birds with sulfur nitride.

4. In a method of repelling birds the step of treating material attractive to the birds with a mixture of sulfur nitride and imino sulfur in admixture with an inert powder.

5. In a method of protecting seeds from attack by birds the step of treating the seeds with a finely divided solid material containing sulfur nitride.

6. In a method of protecting seeds from attack by birds the step of treating the seeds with a mixture of sulfur nitride, imino sulfur, sulfur and a mineral filler, all in the finely divided state.

7. The method of protecting seeds from attack by microorganisms, weevils, birds and like pests which comprises treating the seed with a mixture containing sulfur nitride and imino sulfur.

8. The method of protecting seeds from attack by microorganisms, weevils, birds and like pests which comprises treating the seed with a mixture containing sulfur nitride, imino sulfur, and sulfur.

9. A seed-treating composition having disinfectant and bird-repelling properties comprising a finely divided solid mixture containing sulfur nitride and imino sulfur in admixture with an inert powder.

10. A seed-treating composition having disinfectant and bird-repelling properties comprising a finely divided solid mixture containing sulfur nitride, imino sulfur and sulfur.

11. A seed-treating composition having disinfectant and bird-repelling properties comprising a finely divided solid mixture containing sulfur nitride, imino sulfur, sulfur and ammonium chloride in admixture with an inert powder.

12. A pest control composition comprising a finely divided solid inert carrier having dispersed therein toxicant material an essential active ingredient of which is imino sulfur.

13. A seed-disinfectant composition comprising a finely divided solid inert carrier having dispersed therein toxicant material an essential active ingredient of which is imino sulfur.

14. In a method of disinfecting seeds and protecting them by attack by pests the step of treating the seed with a finely divided solid inert carrier having dispersed therein toxicant material an essential active ingredient of which is imino sulfur.

OWEN BEVAN LEAN.
PERCY WRAGG BRIAN.

REFERENCES CITED

The following references are of record in the file of this patent:

UNITED STATES PATENTS

| Number | Name | Date |
| --- | --- | --- |
| 2,207,791 | Fernelius | July 16, 1940 |
| 2,101,645 | Fulton et al. | Dec. 7, 1937 |
| 2,190,177 | Swinehart | Feb. 13, 1940 |

OTHER REFERENCES

"Spraying, Dusting and Fumigation of Plants," Mason, 1928, page 25.

"Scientific Principles of Plant Protection," Martin, 1936, pages 260–262.

"Chemical Abstracts," vol. 18, page 28 (1925), American Chem. Soc.